United States Patent
Schreiber

(10) Patent No.: US 8,711,590 B2
(45) Date of Patent: Apr. 29, 2014

(54) CIRCUIT AND METHOD FOR GENERATING AN AC VOLTAGE FROM A PLURALITY OF VOLTAGE SOURCES HAVING A TEMPORALLY VARIABLE DC OUTPUT VOLTAGE

(75) Inventor: Dejan Schreiber, Nürnberg (DE)

(73) Assignee: Semikron Elektronik GmbH & Co., KG, Nürnberg (DE)

( * ) Notice: Subject to any disclaimer, the term of this patent is extended or adjusted under 35 U.S.C. 154(b) by 300 days.

(21) Appl. No.: 13/073,581

(22) Filed: Mar. 28, 2011

(65) Prior Publication Data

US 2011/0235377 A1 Sep. 29, 2011

(30) Foreign Application Priority Data

Mar. 27, 2010 (DE) .......................... 10 2010 013 138

(51) Int. Cl.
*H02M 7/48* (2007.01)

(52) U.S. Cl.
USPC .................................. 363/71; 363/40; 363/65

(58) Field of Classification Search
USPC ............. 363/40, 55, 56.01, 56.02, 65, 71, 72, 363/95, 97, 98, 131, 132
See application file for complete search history.

(56) References Cited

U.S. PATENT DOCUMENTS

| | | | |
|---|---|---|---|
| 4,135,235 A | 1/1979 | Baker | |
| 7,706,163 B2 * | 4/2010 | Tan et al. ....................... | 363/132 |
| 2007/0035975 A1 * | 2/2007 | Dickerson et al. ............. | 363/131 |
| 2007/0182362 A1 | 8/2007 | Trainor et al. | |
| 2008/0164766 A1 * | 7/2008 | Adest et al. ..................... | 307/80 |
| 2009/0218887 A1 | 9/2009 | Ledenev et al. | |
| 2010/0019754 A1 | 1/2010 | Schreiber | |

FOREIGN PATENT DOCUMENTS

DE   10 2008 034 955   2/2010

* cited by examiner

*Primary Examiner* — Nguyen Tran
(74) *Attorney, Agent, or Firm* — The Law Office of Roger S. Thompson

(57) ABSTRACT

A circuit comprising at least one parallel-connected partial circuit for feeding at least one inverter circuit. A partial circuit consists of an unregulated voltage source having a temporally varying DC output voltage, a voltage doubling circuit and a voltage regulating circuit with an associated regulating device. In the inventive method, the voltage doubling circuit doubles the voltage of the unregulated voltage source. The regulation of the current/voltage characteristic curve, the MPP tracking, of the unregulated voltage source is effected by the regulating device of the voltage regulating circuit.

14 Claims, 4 Drawing Sheets

CIRCUIT AND METHOD FOR GENERATING AN AC VOLTAGE FROM A PLURALITY OF VOLTAGE SOURCES HAVING A TEMPORALLY VARIABLE DC OUTPUT VOLTAGE

BACKGROUND OF THE INVENTION

1. Field of the Invention

The invention is directed to a circuit for generating an AC voltage from a plurality of unregulated voltage sources having a temporally variable DC output voltage, such as photovoltaic installations or parts thereof, and a method for driving such a circuit. A "photovoltaic installation" should be understood here to mean exclusively the arrangement and electrical connection of a plurality of photovoltaic modules, as well as partial installations thereof. Such photovoltaic modules are connected together to form photovoltaic installations and have a design-dictated DC output voltage that is dependent on the level of incident sunlight and is thus temporally slowly variable, i.e., it varies over time. These changes in the DC output voltage have time constants on the order of minutes or longer.

2. Description of the Related Art

To feed the output current of photovoltaic installations into a power grid, whether public or local, the DC output voltage has to be converted, by means of an inverter circuit, into an AC voltage of constant frequency and voltage.

One exemplary circuit for generating such an AC voltage is described in DE 10 2008 034 955 A1, which discloses a power converter arrangement having a photovoltaic installation with a temporally varying output voltage, a level converter and an inverter. In the associated method, first and second capacitors of the level converter are charged independently of the input voltage with, in each case, half the value of the desired intermediate circuit voltage. What is disadvantageous about such known circuits is that, in such known circuits, the photovoltaic installation is loaded with a current that fluctuates for a short time in the frequency range of the driving of the level converter.

For such circuit arrangements there are a large number of application-dependent and partly conflicting requirements. By way of example, the individual photovoltaic modules are intended to be loaded as linearly as possible, i.e., their output current is intended to be as constant as possible over time within time intervals such as are typical of power semiconductor circuits, i.e., in the time range of less than one second, or in a frequency range above 1 Hz. Likewise, the input voltage at the inverter circuit is intended to be as constant as possible, and the transmission from the photovoltaic installation to the inverter circuit is intended to be effected with the highest possible voltage so that line losses are minimized.

Finally, the entire circuit is intended to operate with a high efficiency and in this case the number of components required is intended to be small. Their dimensioning, especially that of coils and capacitors, is likewise intended to be as small as possible. At the same time, the photovoltaic installation or the photovoltaic modules thereof should be operated in such a way that it operates at the point of maximum power output (MPP—maximum power point). Suitable regulation, so-called MPP tracking, is necessary for this purpose.

SUMMARY OF THE INVENTION

The invention is directed to a circuit and an associated method for generating an AC voltage from a plurality of voltage sources, each voltage source having a temporally variable DC output voltage, wherein the current loading these voltage sources is uniform and the transmission to the inverter circuit incurs the lowest possible losses.

The inventive circuit comprises one or more parallel-connected partial circuits for feeding at least one inverter circuit which is connectable to at least one assigned transformer. Each partial circuit includes an unregulated voltage source with a temporally varying DC output voltage, a voltage doubling circuit and a voltage regulating circuit with an assigned regulating device.

According to the inventive method for driving such a circuit, the input voltage is doubled by the voltage doubling circuit by virtue of two power transistors of a half-bridge circuit being switched on in a temporally offset manner and in each case with the same period duration of, in each case, half of the switching period. As a result, the unregulated voltage source is loaded in a constant fashion, i.e., its output current has no short-term fluctuations i.e., in the range of one second or less, as is preferred especially for photovoltaic installations or photovoltaic modules.

It is preferred if the voltage doubling circuit has respective branches of positive and negative polarity, wherein, at the inputs thereof, first and second inductances, formed from a first and second coil or else just from the inductance of the respective supply line from the voltage source, are respectively provided. The first and second inductances are followed by a half-bridge circuit formed by two power transistors between the positive and negative branches. Afterwards, in both branches, a diode and, following the latter, a series circuit formed by two capacitors, which connects both branches are positioned.

For the configuration of the voltage regulating circuit, two variants are particularly preferred, in principle. The first variant has two separate partial circuits, a step-up converter and a step-down converter. For the arrangement thereof, two variants are likewise advantageous. In a first variant, the respective step-up converters are provided directly after the assigned voltage doubling circuits to raise the output voltages thereof to the same potential. The respective step-down converter is then provided at the inverter circuit to lower the transmission voltage to a suitable value of the intermediate circuit voltage. This variant has the advantage of making available a particularly high voltage for power transmission between the photovoltaic installation and the inverter circuit and thus of keeping the line losses low to the extent possible. Consequently, it is also possible to reduce the dimensioning of the transmission cables and the associated costs owing to the lower value of the transmission current.

The second variant having two separate partial circuits has the respective step-down converter directly after the assigned voltage doubling circuit, while the step-up converter is arranged at the inverter circuit. Consequently, the transmission takes place at lower voltage compared with the first variant. However, this may be advantageous to adapt the overall installation to safety guidelines and not to have to realize exemplary special protective specifications for higher voltages. Overall, the voltage regulating circuit comprising two separate converter circuits affords high flexibility for adapting the partial circuit arrangement to the application-specific conditions.

In principle, the second variant of the voltage regulating circuit is constructed identically to the voltage doubling circuit and can therefore advantageously also be produced with identical power semiconductor modules. However, according to its task, this voltage regulating circuit is driven differently from the voltage doubling circuit and serves for adapting the DC output voltage of the different partial circuit arrangements that are to be connected in parallel with one another.

The regulation of the current/voltage characteristic curve that is necessary in photovoltaic installations, MPP tracking, is likewise effected by the regulating device of the voltage regulating circuit in addition to the described adaptation of the output voltage of the voltage doubling circuit to the intermediate circuit voltage of the inverter circuit.

As the inverter circuit, in principle three-phase inverters can variously be provided. It is particularly advantageous to arrange two three-phase inverters in parallel and to drive them in a manner offset by half a switching period. This results in an output voltage that sufficiently approximates the desired sinusoidal output.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1A:
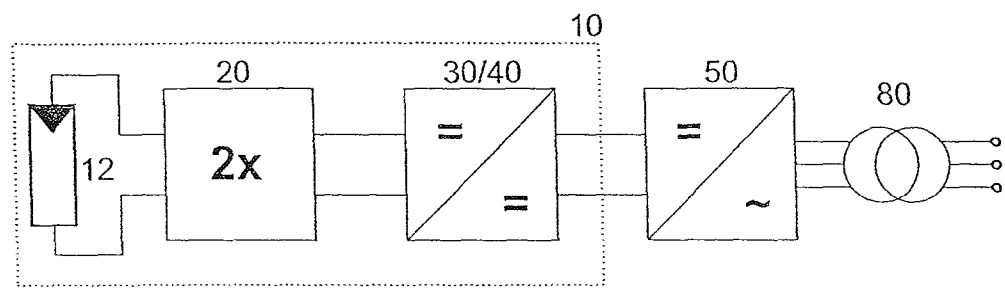
FIGS. 1a-1d show the basic principle of a first circuit according to the invention, and some of the components of that circuit.
Figure 1B:
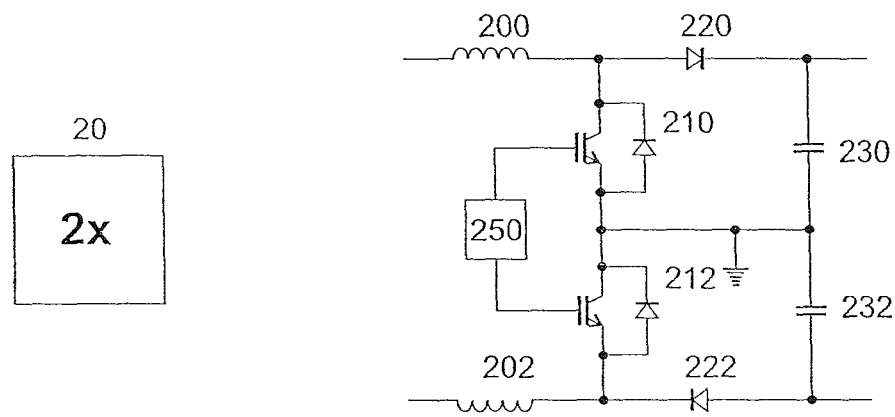
Figure 1C:
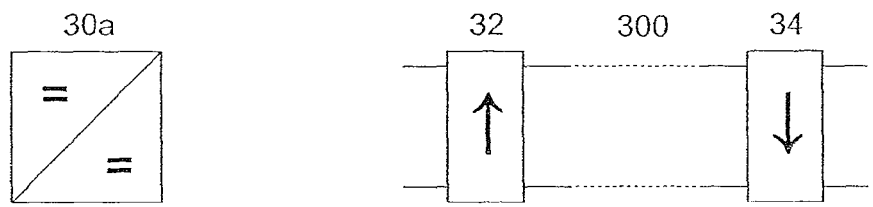
Figure 1D:
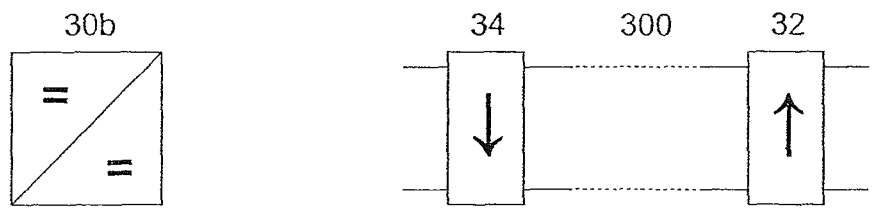

FIG. 1 schematically shows the basic principle of a first circuit according to the invention, and some of the components of that circuit. FIG. 1a shows an unregulated voltage source 12, here a photovoltaic installation, having known fluctuations in its DC output voltage, and also of the output current, due to variation of incident sunlight. For advantageous operation of such a photovoltaic installation 12, it is necessary to regulate the output voltage and current so that the output power is maximized. This is known as MPP tracking. Moreover, it is advantageous to load photovoltaic installation 12 so that the output current has no brief fluctuations.

Therefore, in accordance with the invention, the output of photovoltaic installation 12 is followed by a voltage doubling circuit 20, which leads to an output current without brief fluctuations. Voltage doubling circuit 20, illustrated in FIG. 1b, comprises respective branches of positive and negative polarity, with an inductance 200, 202 in each branch. Inductances 200, 202 are formed by connecting lines between photovoltaic installation 12 and the further components of voltage doubling circuit 20. Should inductances 200, 202 be insufficient, in comparison with the prior art, additional coils having a low inductance can be provided as well. Formally, therefore, voltage doubling circuit 20 here includes connecting lines to photovoltaic installation 12. These connecting lines have a length of the order of magnitude of ten meters.

Following inductances 200, 202, a half-bridge circuit is provided between the positive and negative branches. For its part, the half-bridge circuit has a series circuit formed by first and a second power transistors 210, 212, if appropriate with freewheeling diodes reverse-connected in parallel.

The half-bridge circuit is connected by means of a respective diode 220, 222 per branch to a series circuit 230, 232 formed by second capacitors 230, 232. In this case, in the first branch, the branch of positive polarity, the anode of diode is 220 connected to the half-bridge circuit and the cathode is connected to the capacitor circuit. In the second branch, the branch of negative polarity, the cathode of diode 222 is connected to the half-bridge circuit and the anode is connected to the capacitor circuit.

It is furthermore preferred if the respective center taps of the half-bridge circuit and of the capacitor circuit are connected to one another. For the function as voltage doubling circuit 20, both power transistors 210, 212 are turned on alternately for in each case the same time interval with a moderate switching frequency of preferably between 500 Hz and 2 kHz. Switching frequencies below 250 Hz and up to 5 kHz are also suitable, but generally not necessary. Consequently, at any time a current flow through either the first or second power transistor 210, 212 is provided and, consequently, the current loading of photovoltaic installation 12 is kept constant. "Constant" means here that there are no brief fluctuations especially of the order of magnitude of the driving frequency of the power transistors 210, 212.

Voltage doubling circuit 20 is followed by a voltage regulating circuit 30, 40, which can be configured differently depending on the condition of use. The first variant has a combination of a step-down converter 34 and a step-up converter 32, the order of which is arbitrary, in principle. However, it is essential here that the two converter circuits are not arranged directly adjacent, rather that their connecting line 300, in accordance with FIGS. 1c/d, bridges essentially the distance between photovoltaic installation 12 and inverter circuit 50.

Consequently, by arranging a step-down converter 34 after voltage doubling circuit 20, it is possible to set the voltage in connecting line 300 to a value below a defined threshold, for example below 600V or below 1000V. This can significantly simplify the complexity for protection against electric shock depending on national specifications relative to higher voltages.

An analogous configuration with interchange of converter circuits 32, 34 enables, by contrast, the maximum possible voltages in connecting line 300, which thus entails a correspondingly smaller value of the current and is therefore advantageous with regard to electrical losses, the dimensioning and also the costs of connecting line 300.

The second variant has, as a voltage regulating circuit 40, a partial circuit which is embodied identically to voltage doubling circuit 20 but is not driven like the latter. For voltage regulation, the two switches are preferably driven for, in each case, identical time intervals but with suitable length and, if appropriate, overlap, to adapt the fluctuating input voltage to the desired constant output voltage.

In both variants, the MPP tracking of photovoltaic installation 12 is controlled by voltage regulating circuit 30, 40, not by voltage doubling circuit 20. Consequently, it is not necessary for voltage doubling circuit 20 to have a control connection of its regulating device 250 to voltage regulating circuit 30, 40 or inverter circuit 50.

Photovoltaic installation 12, voltage doubling circuit 20 and respective voltage regulating circuits 30, 40 form a partial circuit connected to an inverter circuit 50 to form a circuit according to the invention.

FIG. 2 shows components of a circuit according to the invention. Step-down converter 34, in accordance with FIG. 2a, has a power transistor 340 in its first branch, that of positive polarity. This is followed by a diode 342, which connects the first branch to the second branch, and an inductance 344 in the first branch, and also a capacitor 346 connecting the two branches. In the abovementioned application with a connecting line following step-down converter 34, it may be sufficient for inductance 344 to be formed by the inductance of connecting line 300, (cf. FIG. 1d), or by a small coil.

Figure 2A:
FIGS. 2a and 2b show further components of the inventive circuit.
Figure 2A:
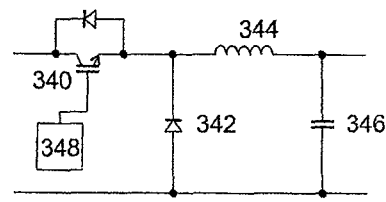
Figure 2B:
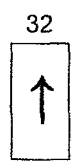
Figure 2B:
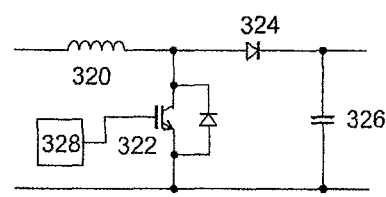

Step-up converter 32, in accordance with FIG. 2b, has an inductance 320 in its first branch. Inductance 320 likewise advantageously is formed by a connecting line 300, (cf. FIG. 1c), or, if appropriate with an additional coil having low inductance. This is followed by a power transistor 322, which connects the first branch to the second branch, a diode 324 in the first branch, and a capacitor 326 connecting the two branches.

Figure 3A:
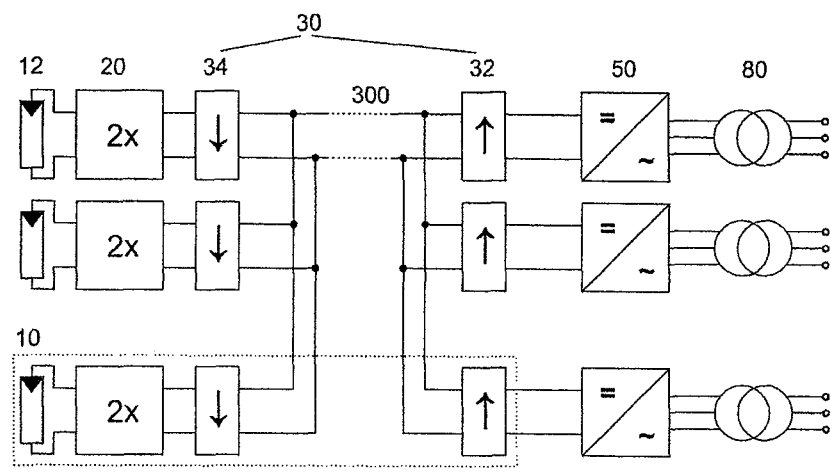
FIGS. 3a and 3b shows the basic principle of further configurations of the inventive circuit.

FIG. 3 shows the basic principle of a further configurations of the circuit arrangement according to the invention. FIG. 3a illustrates here the arrangement of partial circuits 10 which, in accordance with the first variant, as described with regard to FIG. 1, is constructed with a voltage regulating circuit consisting of two converter circuits 32, 34. In this case, the partial circuits are connected to one another and connected in parallel with one another in the region of connections 300 of two converter circuits 32, 34. The outputs of the respective partial circuits are then connected to a suitable inverter circuit 50.

Figure 3B:
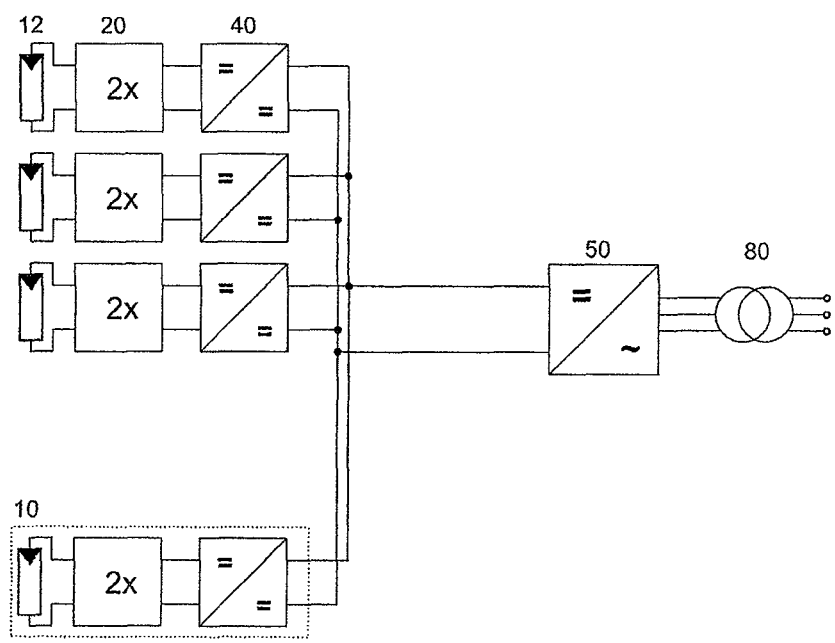

FIG. 3b shows an arrangement in accordance with the second variant mentioned above in the case of FIG. 1 with two circuits for voltage doubling 20 and voltage regulating 40, which are embodied in identical fashion but driven differently. In this case, the outputs of the partial circuits are connected to one another and to a suitable inverter circuit 50.

Figure 4A:
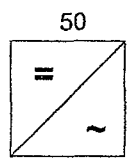
FIGS. 4a and 4b show further components of the inventive circuit.
Figure 4A:
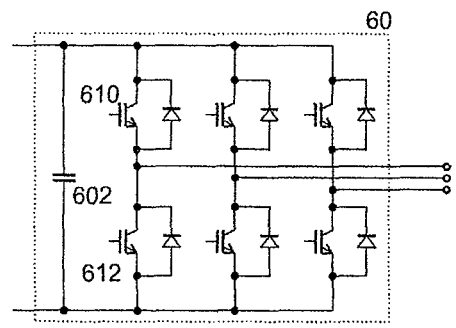

FIG. 4 shows further components, here two embodiments of inverter circuit 50, of a circuit arrangement according to the invention. In the simplest case, the inverter circuit is embodied as a three-phase bridge circuit 60 in accordance with the prior art, illustrated in FIG. 4a.

Figure 4B:
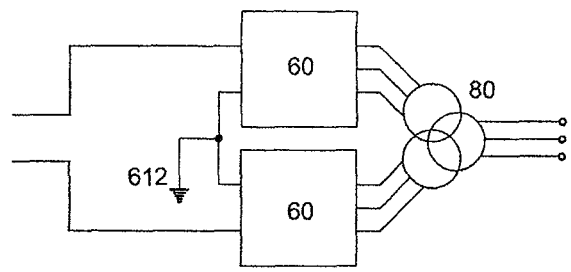

It is advantageous, however, as illustrated in FIG. 4b, for two three-phase bridge circuits 60 of this type to be connected in parallel and to be clocked in a manner offset relative to one another by half a switching period. In this case, the midpoint of the two three-phase bridge circuits 60 are at ground potential 612 or at the mid-potential 212 of voltage doubling circuit 20. Likewise, it may alternatively be advantageous to provide a three-point inverter as inverter circuit 50.

Figure 5A:
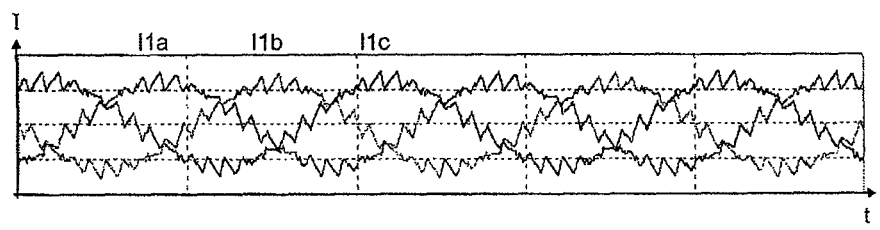
FIGS. 5a and 5b show the simulation of the output current of the inventive circuit upon application of the inventive method.
Figure 5B:
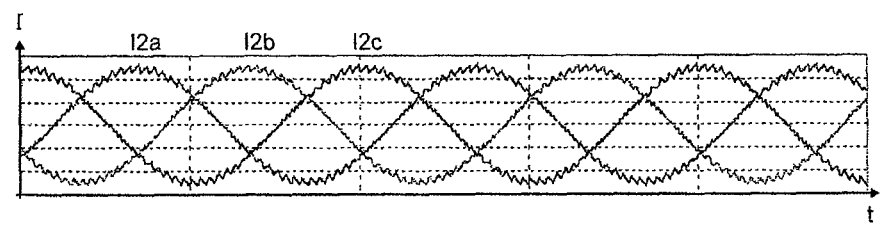

FIG. 5 shows the simulation of the output current of the inventive circuit, comprising an inverter circuit 50 in accordance with FIG. 4b upon application of the inventive method. In comparison with the output current of an inverter circuit in accordance with FIG. 4a, the latter has a correspondingly highly disturbed profile of the sinusoidal curve owing to the use of voltage regulating circuit 30, 40. Through the use of inverter circuit 50 in accordance with FIG. 4b and as a result of the offset clocking of the two parts of that inverter circuit, it is possible to significantly reduce the ripple within the respective sinusoidal curves of the three phases of the output current.

The entire circuit arrangement thus provides the following advantages:

constant loading of the voltage source;

flexible choice of the transmission voltage to the inverter circuit;

coils having small dimensions in the voltage doubling circuit and in the voltage regulating circuits; and an output current having low ripple.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A circuit comprising at least one partial circuit for receiving power from an unregulated voltage source having a temporally varying DC output voltage, and for feeding at least one inverter circuit which is adapted to be connected to a transformer, wherein the partial circuit comprises:

a voltage doubling circuit; and a voltage regulating circuit with a regulating device, said voltage regulating circuit including:

a step-down converter having a first power transistor in a positive branch, a first diode connecting said positive branch and a negative branch, and a first inductance; and a step-up converter, in parallel with said step-down converter, and having a second inductance, a second power transistor connecting a positive branch of said step-up converter and a negative branch thereof, and a second diode in said positive branch of said step-up converter;

wherein said step-down converter is arranged directly adjacent to said voltage doubling circuit and said voltage doubling circuit is arranged directly adjacent to said voltage source, and wherein said step-up converter is arranged directly adjacent to said inverter circuit.

2. The circuit of claim 1, further comprising at least two of the partial circuits arranged in parallel.

3. The circuit of claim 1, wherein said voltage doubling circuit has a positive branch of positive polarity, including
a first inductance, and
a first diode in series with said first inductance at a first end of said first diode,
said first inductance and said first end of said first diode having a first junction therebetween;

a negative branch of negative polarity, including
a second inductance, and
a second diode connected in series with said second inductance at a first end of said second diode,
said second inductance and said first end of said second diode having a second junction therebetween;

a half-bridge circuit connected at a first end thereof to said first junction and at a second end thereof to said second junction, said half-bridge circuit including first and second power transistors having a center tap therebetween; and first and second capacitors connected in series, with a first end of said first capacitor being connected to a second end of said first diode and a first end of said second capacitor being connected to a second end of said second diode, said first and second capacitors having a second center tap therebetween.

4. The circuit of claim 3, wherein
said first and second inductances are each formed of a coil.

5. The circuit of claim 3, wherein
said first and second inductances are each formed by the respective inductance in its respective supply line.

6. The circuit of claim 3, wherein
said first and second center taps are connected.

7. The circuit of claim 1, wherein said voltage regulating circuit includes:
a step-down converter having a third power transistor in a positive branch, a third diode connecting said positive branch and a negative branch, and a third inductance; and
a step-up converter, in parallel with said step down converter, and having a fourth inductance, a fourth power transistor connecting a positive branch of said step-up converter and a negative branch thereof, and a fourth diode in said positive branch of said step-up converter.

8. The circuit of claim 7, wherein at least one of said third and fourth inductances is a coil.

9. The circuit of claim 7, wherein
said step-up converter is arranged directly adjacent to said voltage doubling circuit and said voltage doubling circuit is arranged directly adjacent to said voltage source, and wherein said step-down converter is arranged directly adjacent to said inverter circuit.

10. The circuit of claim 1, wherein said voltage regulating circuit is substantially identical to said voltage doubling circuit.

11. A method for driving the circuit of claim 1,
wherein the unregulated voltage source has current/voltage characteristics,
wherein said voltage doubling circuit doubles the voltage of the unregulated voltage source, and the method further comprises the step of:
regulating the current/voltage characteristics of the unregulated voltage source by use of said regulating device of said voltage regulating circuit.

12. A method according to claim 11, wherein
said voltage doubling circuit doubles the voltage of the unregulated voltage source by said first and second power transistors being switched on in a temporally offset manner and in each case having substantially the same period duration of, in each case, approximately one-half of the switching period.

13. The method according to claim 12, wherein
said first and second power transistors are driven with a frequency of between approximately 250 Hz and approximately 5 kHz.

14. The method according to claim 13, wherein
said first and second power transistors are driven with a frequency of between approximately 500 Hz and approximately 2 kHz.

* * * * *